Patented Feb. 5, 1946

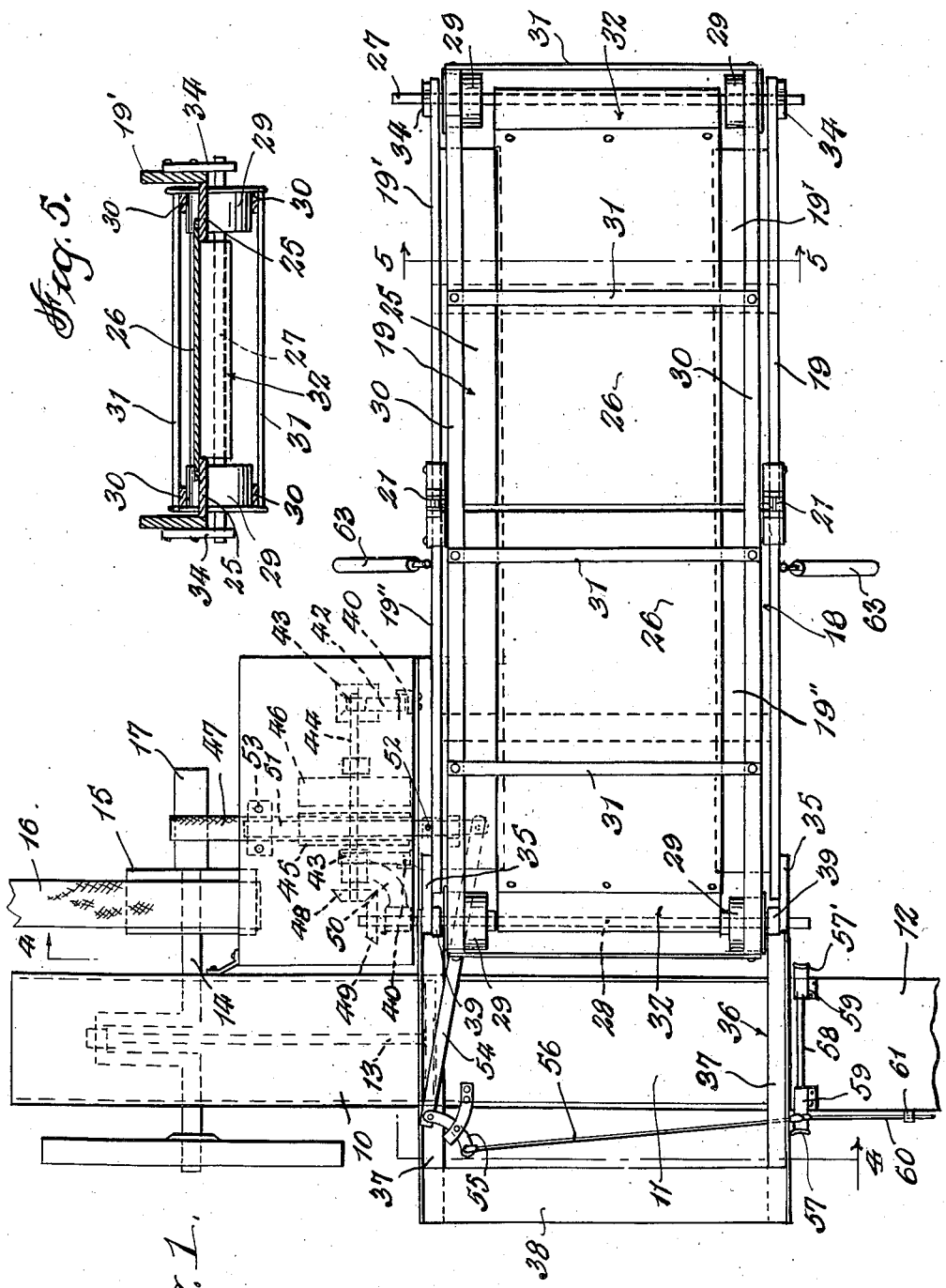

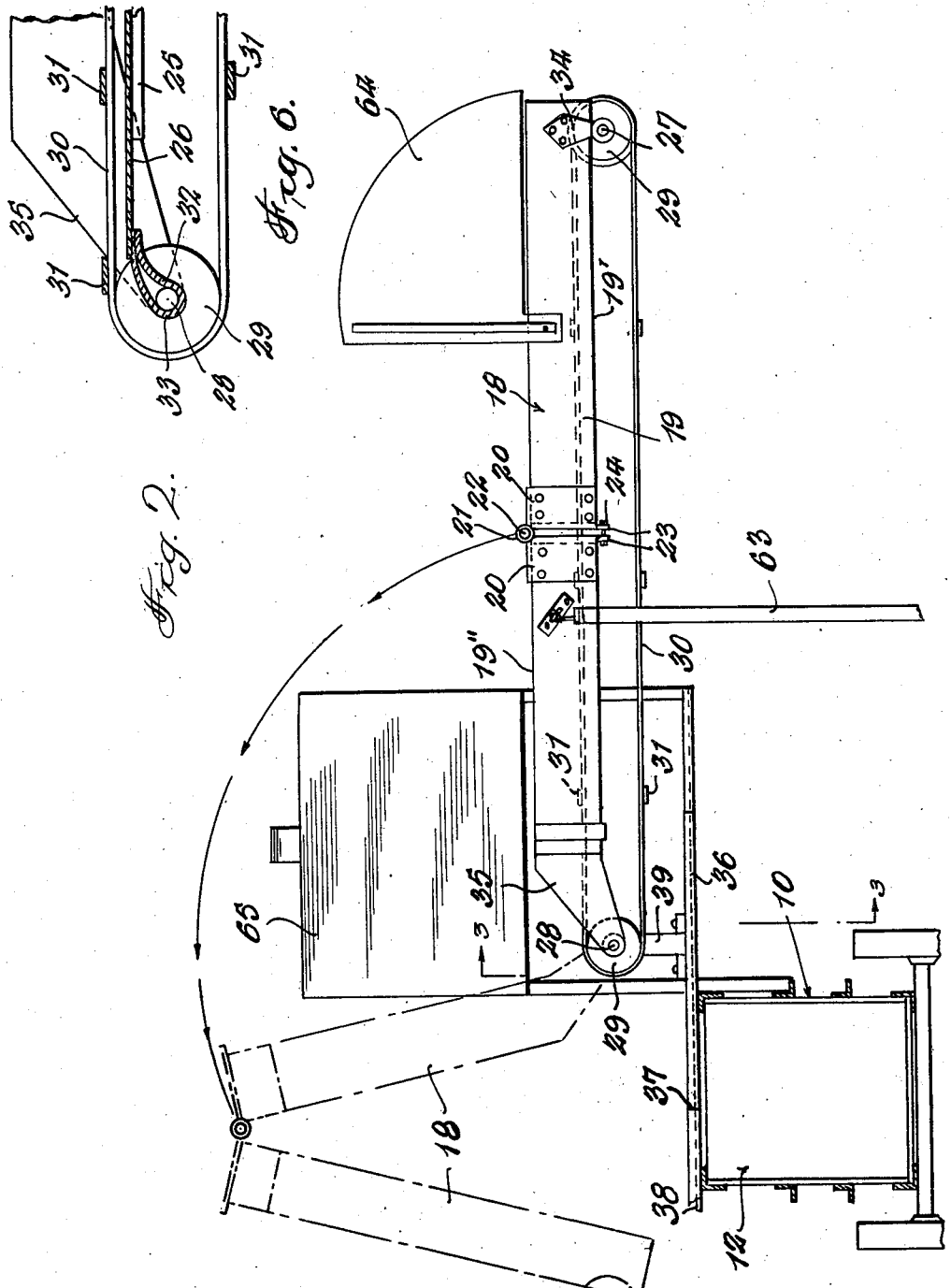

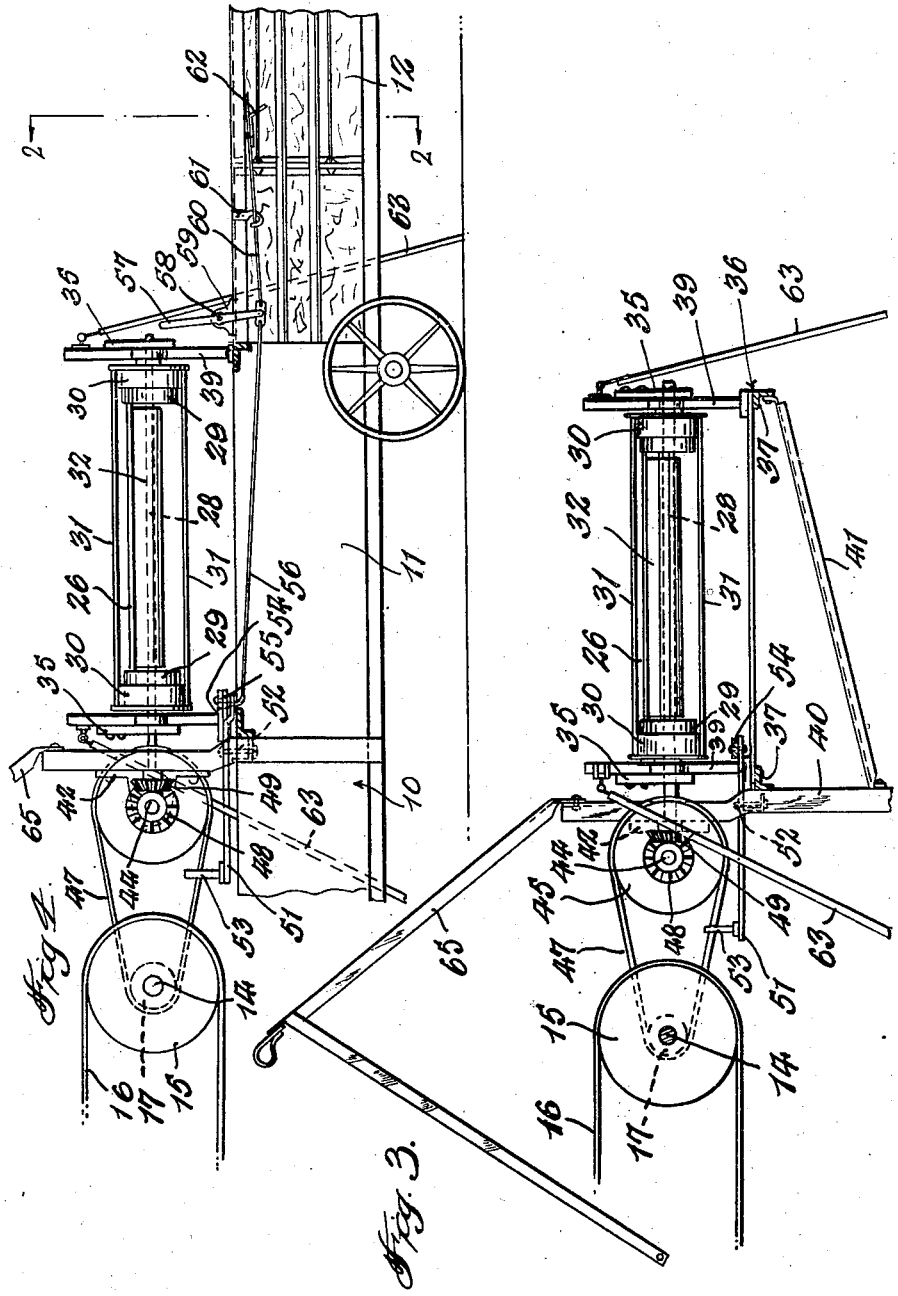

2,394,336

UNITED STATES PATENT OFFICE 2,394,336

SELF-FEEDER FOR HAY BALERS

William E. Smith, Siler City, N. C.

Application July 21, 1944, Serial No. 545,904

1 Claim. (Cl. 100—25)

This invention relates to a self feeder for hay balers and it consists in the constructions, arrangements and combinations herein described and claimed.

It is a principal object of the invention to provide a feeder for balers which is readily attachable or detachable to or from a baler with a minimum of effort.

It is also an object of the invention to provide a feeder which is constructed so as to fold intermediate the length of the conveyor portion thereof, thus enabling ready transportation of the feeder and baler as a unit.

A still further and important object of the invention is the provision of an automatic and manual means for stopping the feed of material to the baler when a required quantity has been delivered to the press of the baler.

Additional objects, advantages and features of invention will be apparent from the following description considered in conjunction with the accompanying drawings, wherein Figure 1 is a top plan view of the feeder and a portion of a baler.

Figure 2 is a vertical section thereof taken on the line 2—2 of Figure 4.

Figure 3 is a cross section on the line 3—3 of Figure 2.

Figure 4 is a sectional view taken on the line 4—4 of Figure 1.

Figure 5 is a cross section on the line 5—5 of Figure 1.

Figure 6 is a fragmentary longitudinal sectional view of the conveyor.

There is illustrated in Figures 1, 2, and 4, a conventional type of mobile hay baler 10, to which my feeder may be attached, and as may be seen in Figure 1, the baler includes a feed hopper 11, compression chamber 12 and compression plunger 13, the latter being reciprocated through a crank shaft 14 driven by a pulley 15, the latter receiving power through a belt 16 actuated from a suitable source, such as a tractor, not shown. A pulley 17 is fixed upon the shaft 14 outwardly of the pulley 15, and functions to provide power to the feeder mechanism now to be described.

The feeder consists essentially of a conveyor 18 mounted upon the baler in such manner as to discharge hay or like material into the feed hopper 11. As clearly shown in Figures 1 and 2, the conveyor comprises respective side frames 19, each of which consists of separate aligned front and rear sections 19' and 19" respectively, the mutually adjacent ends having rigidly mounted thereon brackets 20. The brackets 20 are formed upon their upper sides with hinge knuckles 21 adapted to be interleaved and receive a pivot pintle 22. Upon the lower sides of the brackets 20, respective ears 23 are formed, suitably apertured to receive a bolt 24 for maintaining the side frames 19 in extended aligned relation. It will be apparent from the foregoing description, that a hinge action is presented, the function of which will be explained hereinafter.

Upon the inner sides of the side frames 19' and 19", wooden stringers 25 are secured, extending inwardly toward the longitudinal axis of the conveyor a short distance for support of a sheet metal plate 26.

At front and rear ends of the side frames 19' and 19" respective shafts 27 and 28 are journalled, each shaft having a pair of flange rollers 29 fixed thereon, arranged in longitudinal alignment for mounting conveyor belts 30 at each side of the conveyor frame. The conveyor belts are connected by transverse slats 31 spaced at a suitable distance apart. The sheet metal plate 26 is spaced below the upper run of the belts a distance to afford sliding support of hay or the like, under operation, and in order that the hay will not become entangled about the shafts 27 and 28, a looped metal plate 32 is secured at the ends of the plate 26, the shafts passing through the respective looped portion indicated at 33 in Figure 6.

It will be noted that the conveyor belts 30 lie within the conveyor at a low point therewithin, and this is accomplished by mounting the shaft 27 in a downwardly extending bracket 34 mounted on the free ends of the side frames 19' of the conveyor, and in order that the shaft 28 be held in proper alignment, the side frames 19" are each provided with an angled bracket 35 at the ends thereof, suitably bolted to the ends of the sections. Each bracket 35 is formed with a journal, receiving the shaft 28 therethrough.

In order to mount the conveyor upon the baler 10, a supporting frame 36 is employed, consisting of angle iron members 37, extended transversely across the feed hopper 11 at the ends thereof and suitably secured thereto. The angle iron members 37 extend beyond the baler at each side, the end removed from the conveyor being connected by a platform 38. Intermediate of the length of the members 37 upright bearings 39 are mounted, receiving the shaft 28 therethrough.

From the description thus far given, it will be apparent that the conveyor 18 may be raised and lowered from the position shown in Figure 2, pivoting upon the shaft 28; and further, it will be seen that when the bolts 24 are removed, the front section 19' may be moved upwardly and rearwardly to overlie the section 19" and finally to a position above the baler 10 as shown in Figure 2. By the provision of a hinged conveyor such as described, the baler may be moved into restricted areas, which would not be possible, if the conveyor was formed as a single rigid unit.

A pair of upright standards 40 are mounted upon one of the members 37 and braced by diagonal struts 41. Each of the standards has a bracket 42 mounted thereon, extending at right angles to each standard, each bracket having a bearing 43 for revolubly mounting a shaft 44. Upon the shaft 44 a fixed pulley 45 and a loose pulley 46 are mounted, aligned with the pulley 17 and extended between these pulleys there is a drive belt 47. Outwardly of the fixed pulley 45, and secured upon the shaft 44, there is a bevel gear 48 in mesh with a similar gear 49 fixed upon the conveyor shaft 28. To afford further support to the shafts 28 and 44 they are interconnected by an angle bracket 50.

It is desired to control the feed of material from the conveyor to the hopper 11 of the baler, which necessitates a stopping of the conveyor, automatically or manually, and this is accomplished as follows:

A shiftable lever 51 is pivoted upon the frame member 37 as at 52, the lever extending outwardly beneath the belt 47, and is provided with a pair of upstanding pins 53, between which the belt 47 is disposed. The other end of the lever is pivotally connected to a link 54 which in turn is pivotally connected to an end of a short lever, 55, suitably mounted upon the top side of the baler. To the other end of the short lever 55, a pull rod 56 is connected, extending longitudinally of the baler in the direction of the compression chamber 12, where it is connected to a pivoted lever 57. The lever 57 is fixed upon a shaft 58 rockably mounted in bearings 59 located upon the top of the compression chamber. A second lever 57' is also fixed to the shaft, the levers 57 and 57' constituting the manual means for shifting the belt 47 to and from the fixed and free pulleys 45 and 46.

A second pull rod 60 is operatively connected with the lever 57 and extends through a guide 61. The terminal end of the rod 60 is provided with a divergent spring tongue 62 adapted to engage with the top wire of a bale of hay, as may be seen in Figure 4, the tongue being engaged a distance forwardly of the rear end of the bale.

In use, when it is desired to manually stop operation of the conveyor, either of the levers 57 or 57' may be moved in a direction to draw upon the pull rod 56 and effect a pull upon the link 54, which in turn, will swing the shifter lever 51 in a direction to move the belt from the fixed pulley 45 to the loose pulley 46. To return the belt to operative engagement with the fixed pulley, the lever 57 or 57' is moved in the opposite direction. In view of the forward connection of the tongue 62 with the wire of the bale, ample movement of the rod 56 is permitted.

Where an automatic stopping of the conveyor is desired, during wiring of the foremost bale, the top wire is engaged with the tongue 62 of the rod 60. In due course, the spring tongue 62 will engage the rear bent portion of the bale wire and further forward movement of the wired bale will now effect a drawing action on the pull rods 60 and 56, shifting the belt 47 from the fixed pulley to the loose pulley, effecting a stopping of the conveyor. The compression plunger 13 will continue to reciprocate to compress hay and advance the wired bale until the spring tongue 62 springs upwardly so as to release the wire with which it was engaged. To again set the conveyor in motion, it is only necessary to operate one of the levers 57 or 57' to shift the belt 47.

In order that the conveyor 18 may be supported in horizontal or angular relations with respect to the baler support legs 63 are provided, arranged upon respective sides thereof. These legs may engage the ground as shown in Figure 4 or may be swung in the direction of the baler for securement thereto.

Where the hay or other material is fed to the conveyor 18 by means of a blower, a fender 64 is employed.

Also, it has been found desirable to provide a shield 65 above the gearing and shafting of the drive for the conveyor and this is suitably supported upon the upper ends of the uprights 40.

While I have shown and specifically described my invention, this is by way of illustration only, and I consider as my own all such modifications in construction as fairly fall within the scope of the appended claim.

I claim:

In combination, a compression hay baler having a driven shaft, a pulley on said shaft, said baler having a hopper, a frame structure on said baler beside said hopper, upright bearings on said frame structure, a conveyor having a shaft journalled in said bearings for vertical swinging movement, said conveyor consisting of a receiving section and a delivery section hingedly connected together, support means for the conveyor, drive means for the conveyor comprising a counter shaft, a fixed pulley and a loose pulley on said shaft aligned with the pulley of the driven shaft, a belt normally trained about the pulley of the driven shaft and said fixed pulley, a gear on said counter-shaft in mesh with a gear on the shaft of the conveyor, a shifting lever pivotally mounted on the frame structure and disposed beneath said belt, said lever having upstanding pins at opposite sides of said belt, a link connected to said shifting lever beyond the pivot thereof, a bracket mounting on said baler, a short lever swingably mounted on said bracket and having one end connected to said last named link, a pull rod connected to the other end of said short lever, a manually operated lever on said baler having connection with said pull rod to impart swinging movement to said shifting lever, and a second pull rod having one end connected with said manually operated lever, said second named pull rod having a spring finger at the other end thereof adapted to be engaged beneath a wire of a wired bale of hay.

WILLIAM E. SMITH.